US011195509B2

(12) United States Patent
Talwar et al.

(10) Patent No.: US 11,195,509 B2
(45) Date of Patent: Dec. 7, 2021

(54) SYSTEM AND METHOD FOR INTERACTIVE VIRTUAL ASSISTANT GENERATION FOR ASSEMBLAGES

(71) Applicant: Microsoft Technology Licensing, LLC, Redmond, WA (US)

(72) Inventors: Rajat Talwar, Redmond, WA (US); Otar Bichiashvili, Bellevue, WA (US); Lucas Pritz, Seattle, WA (US); Sagar Narla, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 139 days.

(21) Appl. No.: 16/586,423

(22) Filed: Sep. 27, 2019

(65) Prior Publication Data

US 2021/0065677 A1  Mar. 4, 2021

Related U.S. Application Data

(60) Provisional application No. 62/893,551, filed on Aug. 29, 2019.

(51) Int. Cl.
*G10L 15/22* (2006.01)
*G10L 13/08* (2013.01)
(Continued)

(52) U.S. Cl.
CPC .............. *G10L 13/08* (2013.01); *G10L 13/00* (2013.01); *G10L 15/063* (2013.01); *G10L 15/22* (2013.01); *G10L 2015/225* (2013.01)

(58) Field of Classification Search
CPC ...................... G05B 2219/32014; G10L 15/22
See application file for complete search history.

(56) References Cited

U.S. PATENT DOCUMENTS

2005/0197825 A1  9/2005 Hagerman et al.
2007/0262984 A1* 11/2007 Pruss ...................... G06T 19/20
                                                                345/420
(Continued)

FOREIGN PATENT DOCUMENTS

EP      1065603 A2 *  1/2001  .......... G06F 40/103
EP      1693784 A2    8/2006
WO    2017040230 A1    3/2017

OTHER PUBLICATIONS

Mohr, Peter, et al. "Retargeting technical documentation to augmented reality." Proceedings of the 33rd Annual ACM Conference on Human Factors in Computing Systems. 2015. (Year: 2015).*

(Continued)

*Primary Examiner* — Jialong He
(74) *Attorney, Agent, or Firm* — Fiala & Weaver P.L.L.C.

(57) ABSTRACT

Methods for interactive virtual assistant generation for assemblages are performed by systems and devices. Representations of existing assembly manuals of assemblages are received by a host service. The representations are received from users in the form of captured images and retrieved from websites of assemblage suppliers. The host service extracts information from representations including text and illustrations, and generates instructions including a first set of assembly instructions from the information and an instruction model, and a second set of prompt-response instructions from the information and a language model. The host service generates interactive smart manuals of assemblages using the first set and second sets. Interactive smart manuals may be instances of virtual digital assistants specific to the assemblage. A user executes an interactive smart manual via a user interface (UI) and provides natural language prompts via the UI causing navigation through the manual.

20 Claims, 6 Drawing Sheets

(51) Int. Cl.
*G10L 15/06* (2013.01)
*G10L 13/00* (2006.01)

(56) References Cited

U.S. PATENT DOCUMENTS

| | | | | |
|---|---|---|---|---|
| 2011/0179624 A1* | 7/2011 | Sexton | ............... | G09B 19/04 |
| | | | | 29/428 |
| 2013/0311867 A1* | 11/2013 | Patterson | ............ | G06F 3/0483 |
| | | | | 715/230 |
| 2015/0186155 A1* | 7/2015 | Brown | ............ | G06F 3/04817 |
| | | | | 715/706 |
| 2019/0027147 A1 | 1/2019 | Diamant et al. | | |

OTHER PUBLICATIONS

Mourtzis, Dimitris, Vasilios Zogopoulos, and Fotini Xanthi. "Augmented reality application to support the assembly of highly customized products and to adapt to production re-scheduling." The International Journal of Advanced Manufacturing Technology 105.9 (2019): 3899-3910. (Year: 2019).*

De Amicis, Raffaele, et al. "Augmented Reality for virtual user manual." International Journal on Interactive Design and Manufacturing (IJIDeM) 12.2 (2018): 689-697. (Year: 2018).*

Antifakos, et al., "Proactive Instructions for Furniture Assembly", In International Conference on Ubiquitous Computing, Sep. 29, 2002, 10 Pages.

Kaasschieter, Reinoud, "Building a document-based chatbot", Retrieved From https://www.capgemini.com/2018/03/building-a-document-based-chatbot/, Mar. 5, 2015, 9 Pages.

Kumar, et al., "Contour-Based Character Extraction from Text Regions of an Image", In International Journal of Computer Science and Information Technologies, vol. 2, Issue 3, Jan. 2011, 1267-1271.

Morby Alice, "IKEA assembly made easier through augmented-reality app", Retrieved From https://www.dezeen.com/2018/03/23/ikea-assembly-made-easier-through-augmented-reality-app/, Mar. 23, 2018, 8 Pages.

Ozhiganov, Ivan, "Deep Dive Into OCR for Receipt Recognition", Retrieved From https://dzone.com/articles/using-ocr-for-receipt-recognition, Jun. 21, 2017, 18 Pages.

Radkowski,, et al., "Augmented Reality-Based Manual Assembly Support With Visual Features for Different Degrees of Difficulty", In International Journal of Human-Computer Interaction, vol. 31, Issue 5, Jan. 2015, 337-349.

Shao,, et al., "Dynamic Furniture Modeling Through Assembly Instructions", In Technical Papers, Dec. 5, 2016, 16 Pages.

* cited by examiner

SYSTEM AND METHOD FOR INTERACTIVE VIRTUAL ASSISTANT GENERATION FOR ASSEMBLAGES

CROSS-REFERENCE TO RELATED APPLICATION(S)

This application claim priority to U.S. Provisional Patent Application No. 62/893,551, entitled "SYSTEM AND METHOD FOR INTERACTIVE VIRTUAL ASSISTANT GENERATION FOR ASSEMBLAGES," and filed on Aug. 29, 2019, the entirety of which is incorporated herein by reference.

BACKGROUND

Products such as furniture, tents, toys, storage structures, and/or the like, may require assembly or transformation prior to use, or prior to each use. Such assemblages often come with instruction manuals in the form of a piece of paper or a booklet, or that are printed on packaging, which are easily lost, inconvenient to handle during assembly, not in a form readily savable for later reference, etc. Additionally, such instructions are frequently difficult to follow and/or lacking written details and explanations for assembly steps.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods for interactive virtual assistant generation for assemblages are performed by systems and devices. An interactive smart manual service is hosted on-site or on a network (e.g., in the "cloud"), and provides users with the ability to generate interactive smart assembly manuals of assemblages, that are associated with digital/virtual assistants, based on hardcopies of existing assembly manuals. In one aspect, a representation of an existing assembly manual of an assemblage is received by the host service. The representation may be received from a user, such as in the form of captured images, or may be retrieved as a file from a website of an assemblage supplier. The host service extracts information from the representation, including text and illustrations, and generates instructions for the interactive smart assembly manual. The instruction generation is two-fold. One set of instructions is directed to actual assembly instructions and is based on the extracted information and an instruction model. The other set of instructions is for prompt-response instructions which are directed to navigation of the manual responsive to user prompts and based on the extracted information and a language model. The host service generates the interactive smart manual of the assemblage using the first and second sets of instructions. The generated interactive smart manual may be an instance of a virtual digital assistant and is specific to the assemblage. In another aspect, a user executes an interactive smart manual via a user interface (UI) at a user device. The user provides natural language prompts via the UI causing navigation through the manual for assembly of an assemblage.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
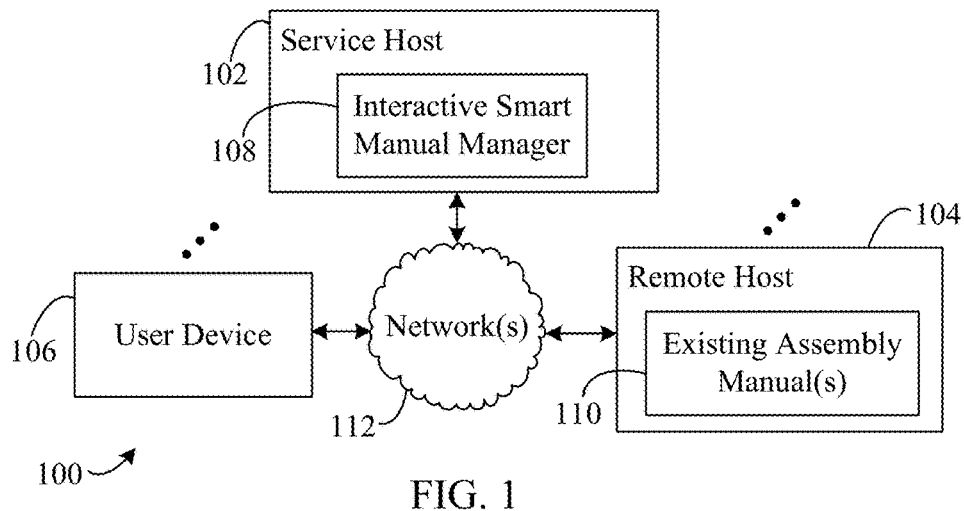
FIG. 1 shows a block diagram of a networked system for interactive virtual assistant generation for assemblages, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for interactive virtual assistant generation for assemblages. Section III below describes example mobile computing device embodiments that may be used to implement features of the embodiments described herein. Section IV below describes additional examples and advantages, and Section V provides some concluding remarks.

II. Example Embodiments for Interactive Virtual Assistant Generation for Assemblages Methods for interactive virtual assistant generation for assemblages are performed by systems and devices. An interactive smart manual service may be hosted on-site or in a network (e.g., the "cloud"), and may provide users with the ability to generate interactive smart assembly manuals of assemblages, that are associated with digital/virtual assistants, based on hardcopies of existing assembly manuals or files therefor. In embodiments, a representation of an existing assembly manual of an assemblage may be received by the host service. The representation may be received from a user, in the form of captured images. For example, a user may use their handheld device, scanner, or a camera to capture images of a paper manual. In another example, a representation of an existing assembly manual is retrieved as a file, e.g., a .pdf file, from a website of an assemblage supplier.

The host service may be configured to extract information from the received representation, including text and illustrations, to generate instructions for the interactive smart assembly manual. The instruction generation is two-fold, according to embodiments. In one aspect, a first set of instructions may be generated directed to actual assembly instructions and may be based on the extracted information and an instruction model. A second set of instructions may be generated for prompt-response instructions directed to interaction with, and navigation of, the manual responsive to user prompts. The second set of instructions may be based on the extracted information and a language model, which may include a language model specific to the user of a user device.

The host service may be configured to then generate the interactive smart manual of the assemblage using the first and second sets of instructions. The generated interactive smart manual may be an instance of a virtual digital assistant specific to the assemblage. In embodiments, the generation of interactive smart manuals may be performed responsive to requests therefor from a user via the user device over a network. Requests may include the representation or an identifier that enables the service to locate and retrieve the representation. Requests may also include user notes regarding the existing assembly manual. Generated interactive smart manuals may be returned to the requesting user, e.g., over the network.

In embodiments, a user may receive the interactive smart manual that is generated as a response to the request, and execute it in association with a user interface (UI) at the user device. The user is enabled to provide natural language prompts, e.g., vocalize prompts/commands, via the UI to cause navigation through the manual for assembly of the assemblage, as well as questions, requests for information, and/or explanation about specific steps, parts, hardware, and/or the like, associated with assembly of the assemblage. Navigation may be forward, backward, sequential, and/or non-sequential through assembly steps, and may also include presentation of illustrations and/or audio/visual explanations responsive to user inputs.

Accordingly, the generation of interactive virtual assistants and interactive smart assembly manuals for the assembly of specific assemblages provides for improved and flexible UIs in which users are enabled to navigate through assembly instructions in a hands-free, voice-driven manner that also allows for navigation to any step in the assembly and provision of specific information based on user inputs during execution and assembling.

These and further embodiments will be described in further detail below, and in the Sections/Subsections that follow.

Systems, devices, and apparatuses may be configured in various ways to perform their functions for interactive virtual assistant generation for assemblages. For instance, FIG. 1 is a block diagram of a networked system 100, according to embodiments. System 100 is configured to perform interactive virtual assistant generation for assemblages, according to embodiments. As shown in FIG. 1, system 100 includes a service host 102, a remote host(s) 104, and a user device(s) 106. In embodiments, service host 102, remote host 104, and/or user device 106 may communicate with each other over a network 112. It should be noted that various numbers of host devices and/or user devices may be present in various embodiments. Additionally, any combination of the components illustrated in FIG. 1 may be present in system 100, according to embodiments.

As noted above, service host 102, remote host 104, and/or user device 106 are communicatively coupled via network 112. Network 112 may comprise any type of communication links that connect computing devices and servers such as, but not limited to, the Internet, wired or wireless networks and portions thereof, point-to-point connections, local area networks, enterprise networks, and/or the like.

One or both of service host 102 or remote host 104 may comprise one or more server computers or computing devices, which may include one or more distributed or "cloud-based" servers. In embodiments, one or both of service host 102 or remote host 104 may be associated with, or may be a part of, a cloud-based service platform such as Microsoft® Azure® from Microsoft Corporation of Redmond, Wash., and in some embodiments one or both of service host 102 or remote host 104 may comprise an on-premises server(s) in addition to, or in lieu of, cloud-based servers. Various systems/devices herein, such as remote host 104, and/or user devices such as user device 106, may be configured to provide data and information, including existing assembly manual representations, requests for generation of interactive virtual assistants/interactive smart assembly manuals, etc., to service host 102 via network 112. Service host 102 may be configured to generate interactive virtual assistants/interactive smart assembly manuals based on such data and information received via network 112.

As illustrated, service host 102 includes an interactive smart manual manager 108 that may be configured to generate interactive virtual assistants/interactive smart assembly manuals, as described herein. Interactive smart manual manager 108 may be configured as a service, in embodiments. Service host 102 may receive representations of existing assembly manuals via network 112 from user device 106 and/or may retrieve representations of existing assembly manuals via network 112 from remote host 104 which may electronically store one or more representations of existing assembly manuals 110. Further details regarding the generation of interactive virtual assistants and/or interactive smart assembly manuals are provided herein. In some embodiments, service host 102 may comprise portions configured to perform machine learning techniques, as described herein.

It should be noted that as described herein, service host 102 and/or remote host 104, may be applicable to any type of system for performance of operations, including generation of interactive virtual assistants and/or interactive smart assembly manuals, according to embodiments. One example of implementations noted above are network, or "cloud," implementations, applications, or services in a network architecture/platform. A cloud platform may include a networked set of computing resources, including servers, routers, etc., that are configurable, shareable, provide data security, and are accessible over a network such as the Internet. Cloud applications/services such as services for generating interactive virtual assistants and/or interactive smart assembly manuals, machine learning, etc., may run on these computing resources, often atop operating systems that run on the resources, for entities that access the applications/services over the network. A cloud platform may support multi-tenancy, where cloud platform-based software services multiple tenants, with each tenant including one or more users who share common access to software services of the cloud platform. Furthermore, a cloud platform may support hypervisors implemented as hardware, software, and/or firmware that run virtual machines (emulated computer systems, including operating systems) for tenants. A hypervisor presents a virtual operating platform for tenants.

User device 106 may be any number, type, or combination of computing devices or computing systems, including a terminal, a personal computer, a laptop computer, a tablet device, a smart phone, a personal digital assistant, a server(s), a wearable device (e.g., a smart watch), and/or the like, including internal/external storage devices, that may be utilized to execute interactive virtual assistants and/or interactive smart assembly manuals. In embodiments, user device 106 may be used by various types of users, including without limitation, end users such as end users of user device 106, software application end users, operating system end users, etc., to initiate generation of interactive virtual assistants and/or interactive smart assembly manuals and execute subsequently execute them for assistance in assembling an assemblage. User device 106 may also include additional components (not shown for brevity and illustrative clarity) including, but not limited to, components and subcomponents of other devices and/or systems herein, as well as those described below with respect to FIGS. 7, 8 and 9, such as an operating system, user interfaces or UIs, input and output devices, etc., and may also include cameras and/or other mechanisms for capturing images of existing assembly manuals.

Remote host 104 may host a website, including any associated storage, of an assemblage supplier or related entity. As noted above, remote host 104 may store one or more representations (e.g., electronic files) of existing assembly manuals 110. In embodiments, there may be more than one instance of remote host 104 in system 100, and representations of existing assembly manuals 110 may include one or more representations. The illustrated embodiment in FIG. 1 is not limited to any specific types of assemblages for which representations of existing assembly manuals 110 are stored; any type of assemblage is contemplated herein. Remote host 104 may be configured to allow access to representations of existing assembly manuals 110 from service host 102 and/or user device 106 for performance of embodiments herein.

Host devices such as service host 102 may be configured in various ways for interactive virtual assistant generation for assemblages. For instance, referring now to FIG. 2, a block diagram of a system 200 is shown for interactive virtual assistant generation for assemblages, according to an example embodiment. System 200 may be an embodiment of system 100 of FIG. 1. System 200 is described as follows.

Figure 2:
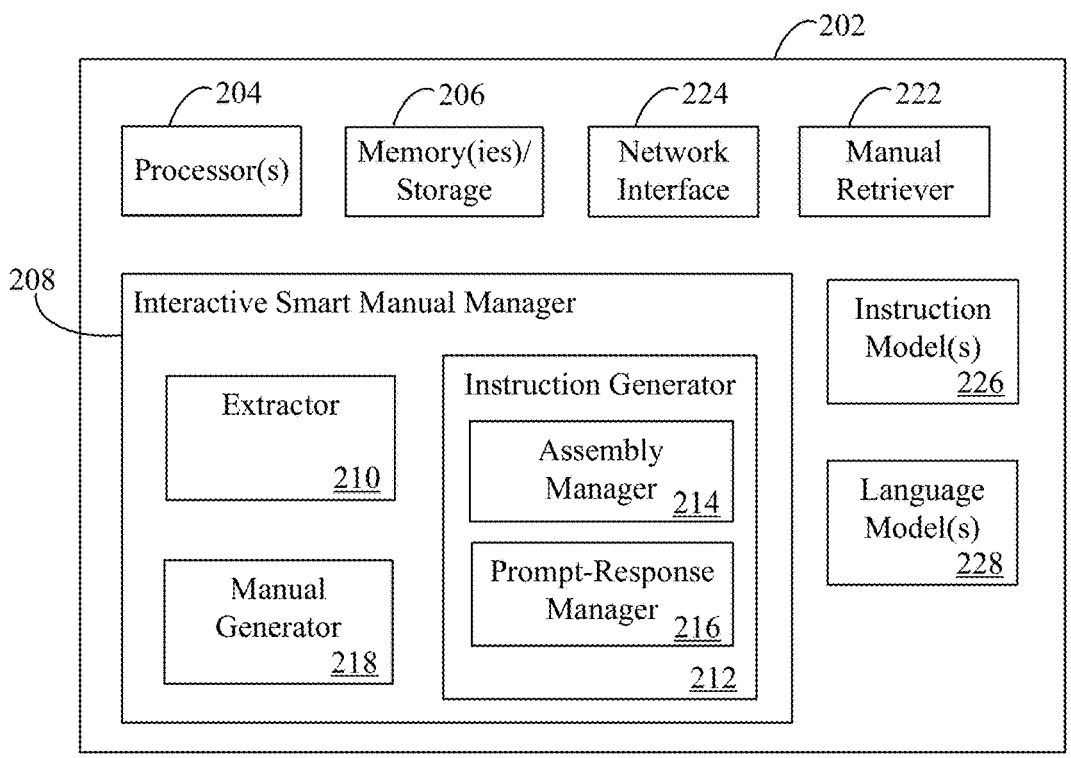
FIG. 2 shows a block diagram of a computing system configured for interactive virtual assistant generation for assemblages, according to an example embodiment.

System 200 includes a computing device 202, which may be an embodiment of service host 102 of FIG. 1, and which may be any type of server or computing device, including "cloud" implementations, as mentioned elsewhere herein, or as otherwise known. As shown in FIG. 2, computing device 202 may include one or more processors ("processor") 204, one or more of a memory and/or other physical storage device ("memory") 206, as well as one or more network interfaces ("network interface") 224. Computing device 202 includes an interactive smart manual manager ("manager") 208 that may be an embodiment of interactive smart manual manager 108 of FIG. 1. Manager 208 may be configured to generate interactive virtual assistants/interactive smart assembly manuals, as described herein. Computing device 202 may also include a manual retriever 222, one or more instruction models 226, and/or one or more language models 228.

System 200 may also include additional components (not shown for brevity and illustrative clarity) including, but not limited to, components and subcomponents of other devices and/or systems herein, as well as those described below with respect to FIGS. 8 and 9, such as an operating system, etc.

Processor 204 and memory 206 may respectively be any type of processor circuit(s) and memory that is described herein, and/or as would be understood by a person of skill in the relevant art(s) having the benefit of this disclosure. Processor 204 and memory 206 may each respectively comprise one or more processors or memories, different types of processors or memories (e.g., a cache for query processing), remote processors or memories, and/or distributed processors or memories. Processor 204 may be multi-core processors configured to execute more than one processing thread concurrently. Processor 204 may comprise circuitry that is configured to execute computer program instructions such as, but not limited to, embodiments of manager 208, which may be implemented as computer program instructions for interactive virtual assistant generation for assemblages, etc., as described herein.

Memory 206 may store retrieved or received ones of existing assembly manuals 110 of FIG. 1 for generation of interactive virtual assistants and/or interactive smart assembly manuals therefrom, in embodiments, and may be configured to store computer program instructions/code as described above, as well as to store other information and data described in this disclosure including, without limitation, instruction model(s) 226, language model(s) 228, user notes, generic instances of virtual digital assistants, and/or the like.

Network interface 224 may be any type or number of wired and/or wireless network adapter, modem, etc., configured to enable system 200, including computing device 202, to communicate with other devices and/or systems over a network, such as communications between computing device 202 and other devices, systems, hosts, of system 100 in FIG. 1 over a network such as network 112.

Manual retriever 222 may be configured to receive and/or retrieve representations of existing assembly manuals for the performance of embodiments herein. Representations may be received from user devices such as user device 106 of FIG. 1 in the form of files and/or captured images, and may be accompanied by user notes and requests to generation of interactive virtual assistants and/or interactive smart assembly manuals. Similarly, a request from a user device may provide an identifier or other indicia of an existing assembly manual for manual retriever to retrieve, e.g., from a third-part website, as described herein with respect to remote host 104 of system 100 in FIG. 1. In embodiments, manual retriever 222 may be a component of manager 208.

Instruction model(s) 226 may include one or more instruction models that may relate to identifying different parts of instructions, e.g., in a representation of an existing assembly manual, such as but without limitation, parts lists, hardware lists, illustrations, text directions, etc. Such instruction parts can be utilized to generate interactive virtual assistants and/or interactive smart assembly manuals that are configured to provide to users, e.g., via a UI and/or virtual assistant, assembly instructions for assembly of an assemblage related to the representation, according to embodiments. Instruction model(s) 226 may be utilized in conjunction with optical character recognition (OCR) (including cognitive OCR) and/or image recognition (e.g., open source computer vision (OpenCV)) to identify instruction parts and/or their meaning/relevance, in performance of embodiments herein. Instruction model(s) 226 may be trained, and re-trained, using machine learning techniques.

Language model(s) 228 may include one or more language models that may relate to natural language, language use and preferences of a specific user(s), etc., and which can be utilized to generate interactive virtual assistants and/or interactive smart assembly manuals that are configured to receive, interpret, and correctly respond to user prompts, questions, and/or the like, according to embodiments. Language model(s) 228 may be trained, and re-trained, using machine learning techniques.

Manager 208 of computing device 202 includes a plurality of components for performing the functions and operations described herein for interactive virtual assistant generation for assemblages. For instance, manager 208 may be configured to receive or retrieve representations of existing assembly manuals and generate interactive virtual assistants and/or interactive smart assembly manuals as described herein. As noted above, representations may be received from a user device or may be retrieved from a remote host website, e.g., via network interface 224. As illustrated, manager 208 includes an extractor 210, an instruction generator 212, and a manual generator 218

Extractor 210 is configured extract information from representations of existing assembly manuals. Extractor 210 may utilize OCR and/or image recognition components thereof (not shown for brevity) to extract information such as text and illustrations of the representation. Instruction generator 212 is configured to generate computer program instructions for interactive virtual assistants and/or interactive smart assembly manuals as described herein, based at least on the information extracted by extractor 210. For performance therefor, instruction generator 212 may include subcomponents such as an assembly manager 214 and/or a prompt-response manager 216, as shown in system 200 of FIG. 2.

Assembly manager 214 may be configured to generate computer program instructions related to the assembly of an assemblage, and prompt-response manager 216 may be configured to generate computer program instructions related to interaction with, and navigation of, the manual responsive to user prompts during the presentation of assembly instructions. Manual generator 218 is configured to package computer program instructions from assembly manager 214 and prompt-response manger 216 into an instance of an interactive virtual assistant and/or an interactive smart assembly manual that can be executed, e.g., by a user device. In some embodiments, manual generator 218 may be configured to an instance of an interactive virtual assistant and/or an interactive smart assembly manual described herein utilizing machine learning techniques.

While shown separately for illustrative clarity, in embodiments, one or more of the components of manager 208 may be combined together and/or as a part of other components of system 200. In some embodiments, less than all of the components of manager 208 illustrated in FIG. 2 may be included. In software implementations, one or more components of manager 208 may be stored in memory 206, and may be executed by processor 204. Further details regarding manager 208 and its subcomponents are described below.

Figure 3:
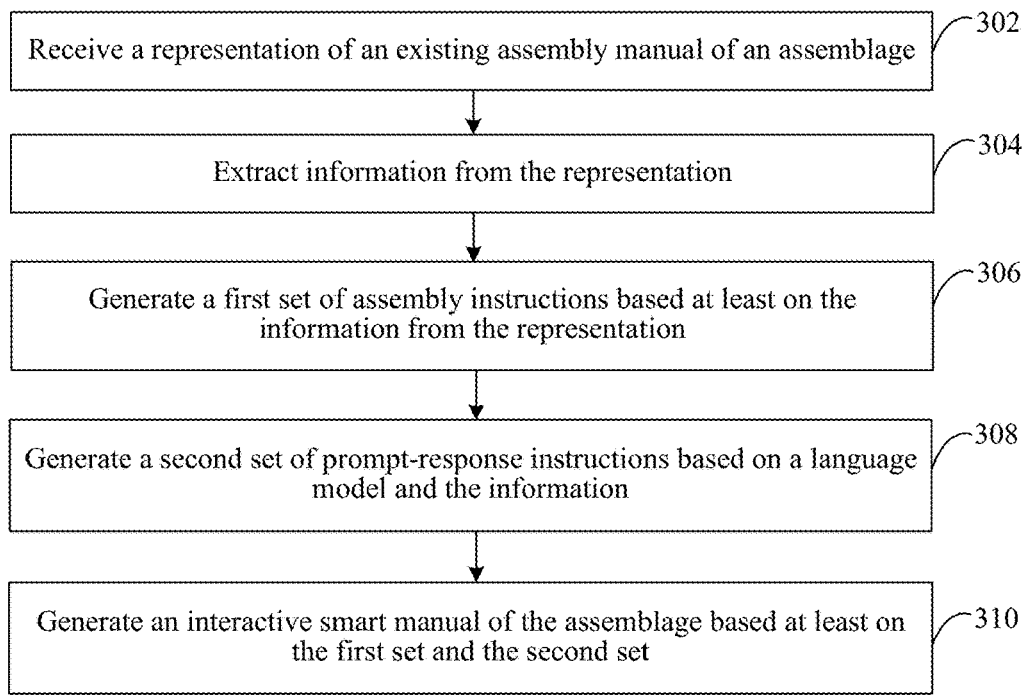
FIG. 3 shows a flowchart for interactive virtual assistant generation for assemblages, in accordance with an example embodiment.
Figure 4:
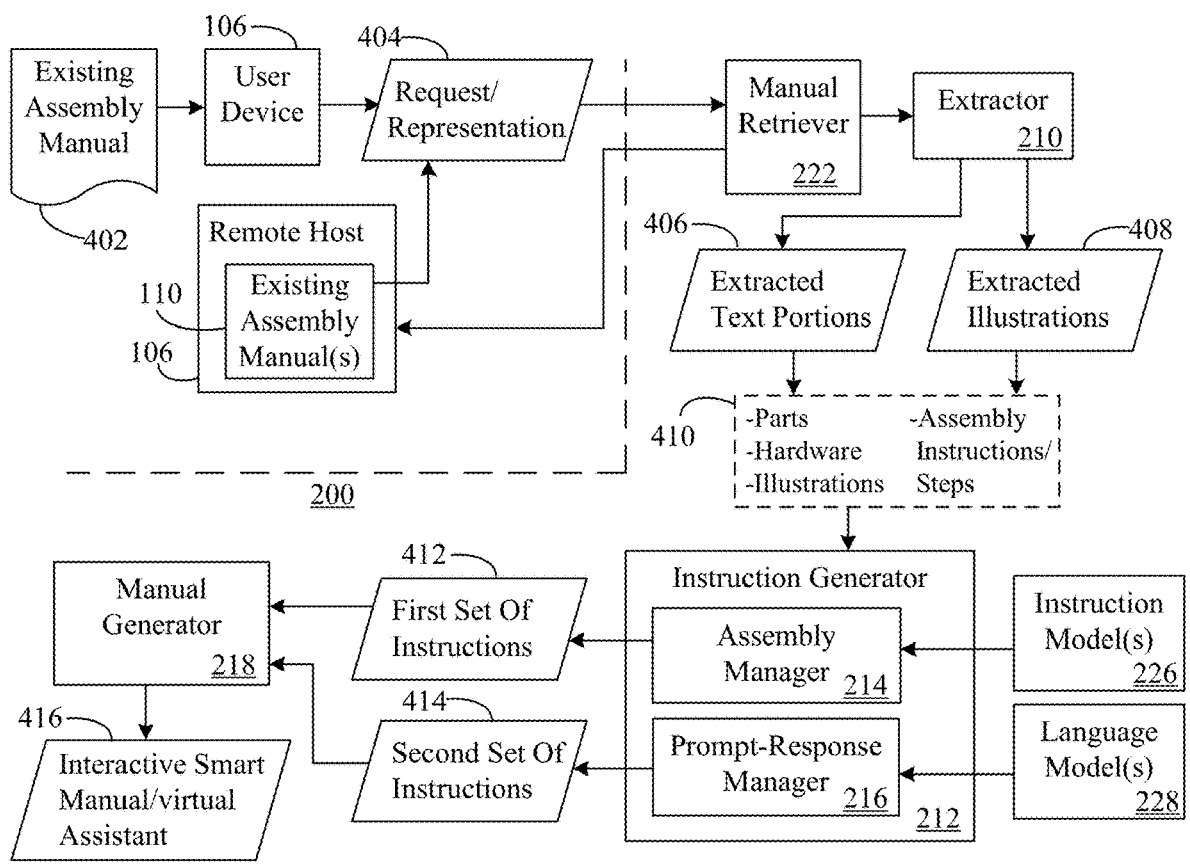
FIG. 4 shows a flow diagram for the system in FIG. 2 with respect to the flowchart of FIG. 3 for interactive virtual assistant generation for assemblages, in accordance with an example embodiment.

As noted above for FIGS. 1 and 2, embodiments herein provide for interactive virtual assistant generation for assemblages. System 100 of FIG. 1 and system 200 of FIG. 2 may each be configured to perform such functions and operations. For instance, FIGS. 3 and 4 will now be described. FIG. 3 shows a flowchart 300 and FIG. 4 shows a flow diagram 400, each being for interactive virtual assistant generation for assemblages, according to example embodiments. System 200 and manager 208 of computing device 202 in FIG. 2 may operate according to flowchart 300 and/or flow diagram 400 in embodiments. Further structural and operational examples will be apparent to persons skilled in the relevant art(s) based on the following descriptions. Flowchart 300 and flow diagram 400 are described as follows with respect to system 100 of FIG. 1 and system 200 of FIG. 2.

A user may desire to generate interactive virtual assistants and/or interactive smart assembly manuals for assembly of assemblages based on a representations of an existing assembly manual and provide the representation or a request therefor from user device 106 to computing device 202 of system 200 to be utilized by manager 208 for such generation.

Flowchart 300 begins at step 302. In step 302, a representation of an existing assembly manual of an assemblage is received. For example, manager 208 of computing device 202 in system 200, which may be an embodiment of service host 102 of FIG. 1, may receive a representation of an existing assembly manual of an assemblage via manual retriever 222. A representation of an existing assembly manual to be used in the generation of interactive virtual assistants and/or interactive smart assembly manuals, according to the embodiments herein.

Referring also now to flow diagram 400, an existing assembly manual 402 is shown. A representation of existing assembly manual 402 may be generated by user device 106, e.g., via image capture using a camera1 thereof, and/or the like, along with a request to generate an interactive virtual assistant and/or interactive smart assembly manual as request/representation 404. Representations may comprise one or more files or other groupings of data including, but not limited to, image formats, text and/or document formats, scripts, .pdf formats, extensible markup language (XML) formats, and/or the like. Request representation 404 is then provided to system 200 where it is received by manual retriever 222.

In other embodiments, request/representation 404 may comprise a request for generation that does not include the representation (e.g., in a case where the user of user device 106 does not have the existing assembly manual) that is provided to manual retriever 222. In such embodiments, manual retriever 222 is configured to retrieve the corresponding representation of the existing assembly manual stored as digital a representation, e.g., a file(s), at remote host 104 of FIG. 1 as existing assembly manual(s) 110. Thus in embodiments, a remote host such as remote host 104 may functions as a repository for representations of existing assembly manuals of any type. Manual retriever 222 is configured to provide the representations to extractor 210. Requests (with or without representations) may be generated by users from a UI (not shown), which may be, or may be similar to, the UI described below with respect to system 700 of FIG. 7.

In step 304 of flowchart 300, information is extracted from the representation. For example, extractor 210 of manager 208, upon receiving the representation of the existing assembly manual from manual retriever 222, is configured to extract information from the representation. The information may include text portions and/or illustration portions of the representation. Extractor 210 may be configured to perform extraction of text portions by different types of OCR such as cognitive OCR, and may be configured to extract illustration portions by image recognition such as OpenCV. Extraction may be performed in any order with respect to text and illustration portions, according to embodiments.

Referring again to FIG. 4, flow diagram 400 illustrates extracted text portions 406 and extracted illustration portions 408 being provided from extractor 210. As shown, extracted text portions 406 and extracted illustration portions 408 may comprise extracted parts 410 that includes, without limitation, a parts list, a hardware list, illustrations, assembly instructions/steps, and/or the like. In embodiments, extractor 210 may be configured to group information or annotate/denote information into such extracted parts for identification by instruction generator 212 to which extracted text portions 406 and extracted illustration portions 408 are provided.

In step 306 of flowchart 300, a first set of assembly instructions is generated based at least on the information from the representation. For instance, instruction generator 212 is configured to generate the first set of assembly instructions, e.g., via assembly manager 214. The first set may be related to the assembly steps for the assemblage from the existing assembly manual, and may be based at least on the extracted information from extractor 210. In embodiments, assembly manager 214 may be configured to group information or annotate/denote information extracted by extractor 210 into different types of extracted parts for identification and generation of the first set of assembly instructions. As one example, a parts list and/or a hardware list may be identified and instructions correspondingly generated to present these lists to a user as an initial part of executing a generated interactive virtual assistant and/or interactive smart assembly manual, followed by instructions for ordered steps to assemble the assembly.

In flow diagram 400 of FIG. 4, subsequent to receiving extracted text portions 406 and extracted illustration portions 408 from extractor 210, instruction generator 212 is configured to generate a first set of assembly instructions 412 via assembly manager 214. First set of assembly instructions 412 may be based on instruction model(s) 226, extracted text portions 406, and/or extracted illustration portions 408, in embodiments. Instruction model(s) 226 may provide one or more models that may relate to identifying different parts of instructions, e.g., in a representation of an existing assembly manual, such as but without limitation, parts lists, hardware lists, illustrations, text directions, etc.

Such instruction parts can be utilized to generate interactive virtual assistants and/or interactive smart assembly manuals that are configured to provide to users, e.g., via a UI and/or virtual assistant, assembly instructions for assembly of an assemblage related to the representation, according to embodiments. Instruction model(s) 226 may be utilized in conjunction with optical character recognition (OCR) (including cognitive OCR) and/or image recognition (e.g., open source computer vision (OpenCV)) to identify instruction parts and/or their meaning/relevance, in the performance of embodiments herein.

In step 308 of flowchart 300, a second set of prompt-response instructions is generated based on a language model and the information. For example, instruction generator 212 is configured to generate the second set of prompt-response instructions, e.g., via prompt-response manager 216. The second set may be related to the navigation between steps for assembly in the first set, and/or related to interaction with a generated interactive virtual assistant and/or interactive smart assembly manual to answer to prompts/questions posed by users during the assembly. The second set may be based at least on the extracted information from extractor 210.

In embodiments, prompt-response manager 216 may be configured to generate prompt-response instructions, e.g., for navigation or to answer user questions, of the second set based on assembly instructions of the first set. As one example, the second set may be generated to include instructions to provide descriptions or prior steps associated with parts and/or assembled part portions to a user based on a prompt or question. Similarly, the second set may be generated to include instructions to go back to a prior step or to advance to a subsequent step for the assembly of the assemblage. Thus, the second set provides additional interactive instructions for a generated interactive virtual assistant and/or interactive smart assembly manual.

The first set of assembly instructions and/or the second set of prompt-response instructions generated in step 306 and step 308, respectively, may comprise computer program instructions as files or other information packages/streams and/or in different formats, XML files, scripts, text files, library files, etc., in embodiments.

In flow diagram 400 of FIG. 4, subsequent to receiving extracted text portions 406 and extracted illustration portions 408 from extractor 210, instruction generator 212 is configured to generate a second set of prompt-response instructions 414 via prompt-response manager 216. Second set of prompt-response instructions 414 may be based on language model(s) 226, first set of assembly instructions 412, extracted text portions 406, and/or extracted illustration portions 408, in embodiments. Language model(s) 228 may include one or more language models that may relate to natural language, language use and preferences of a specific user(s), etc., and which can be utilized to generate interactive virtual assistants and/or interactive smart assembly manuals that are configured to receive, interpret, and correctly respond to user prompts, questions, and/or the like, according to embodiments. In some cases, language model(s) 228 may include a language model specific to the user of user device 106.

For example, if the user typically vocalizes a specific command to proceed to the last step of an assembly process, this specific command may be associated with a corresponding instruction to take the user to the last step. Likewise, the use of words such as "go," "what's next?", or "next," may be as associated with a corresponding instruction to take the user to the next step, while "go back," or "previous," may be as associated with a corresponding instruction to take the user to the prior step. In an example, "go to step X" may be as associated with a corresponding instruction to take the user to a specified step.

Other commonly used language may be represented via language model(s) 228 such as, but not limited to, "what is a <tool>?", "what is a <part>?", "which step did I assemble the <assembled portion>?", and/or the like. Prompt-response manager 216 may be configured to generate instructions for the second set corresponding to the actions needed to respond to such prompts and questions appropriately, e.g., showing/describing a part or hardware, informing the user in which step the tool or part was last used and how, etc.

In step 310 of flowchart 300, an interactive smart manual of the assemblage is generated based at least on the first set and the second set. For instance, manual generator 218 may be configured generate an interactive smart manual of the assemblage. The interactive smart manual may be generated based on the first set and second set of instructions in step 306 and step 308. In some embodiments, the interactive smart manual may be an instance of an interactive virtual assistant, such as a stand-alone virtual digital assistant specific to the interactive smart manuals, or may be integrated with or executable with, an existing interactive virtual assistant, such as Cortana® from Microsoft Corporation of Redmond, Wash. That is, while some embodiments are described with respect to generated interactive smart manuals, the embodiments herein are not so limited and are applicable to different types of interactive virtual assistants and/or instances thereof, as well as being applicable to UIs for improvements thereto as described herein.

As shown in flow diagram 400, instruction generator 212 provides first set of assembly instructions 412 and second set of prompt-response instructions 414 to manual generator 218 as inputs. Manual generator 218 is configured to generate an interactive smart manual/interactive virtual assistant 416 based on these inputs. Manual generator 218 is configured to generate an interactive smart manual/interactive virtual assistant 416 as a stand-alone executable computer program, as an instance of a virtual digital assistant, as an add-on for a virtual digital assistant, and/or the like.

An interactive smart manual/interactive virtual assistant generated in step 310 may comprise computer program instructions as files or other information packages/streams and/or in different formats, XML files, scripts, text files, library files, captured or extracted images, etc., in embodiments, and may comprise a packaged program or computer executable application. In embodiments, interactive smart manuals/interactive virtual assistants generated may comprise instances or extensions of an existing virtual digital assistant.

In embodiments, request/representation 404 may include information related to user device 106 such as the operating system utilized, virtual digital assistants used, a service associated with computing device 202/service host 102, etc., which may be referenced during the processes described above to generate interactive smart manual/interactive virtual assistant 416 in a manner that it may be employed by user device 106.

Additionally, generated interactive smart manual/interactive virtual assistant 416 may be stored by system 200, e.g., in memory 206, for later retrieval and use by the user, or by other users.

Figure 5:
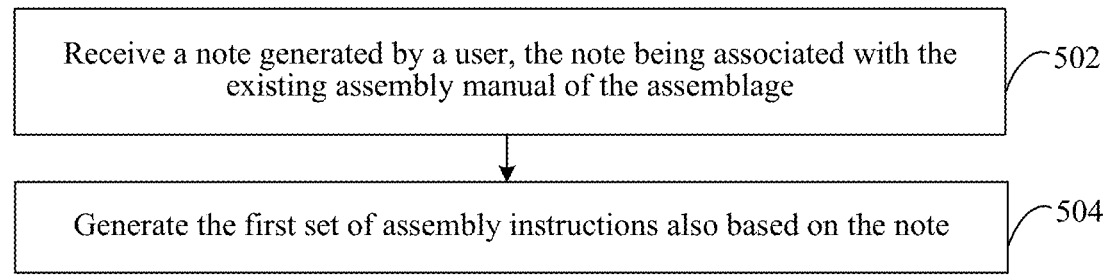
FIG. 5 shows a flowchart for interactive virtual assistant generation for assemblages, in accordance with an example embodiment.

FIG. 5 shows a flowchart 500 for interactive virtual assistant generation for assemblages, according to example embodiments. System 200 and manager 208 of computing device 202 in FIG. 2 may operate according to flowchart 500 in embodiments. Further structural and operational examples will be apparent to persons skilled in the relevant art(s) based on the following descriptions. Flowchart 500 may be an embodiment of flowchart 300 of FIG. 3, and is described as follows with respect to system 100 of FIG. 1 and system 200 of FIG. 2, and also with respect to flow diagram 400 of FIG. 4.

Flowchart 500 begins with step 502. In step 502, a note generated by a user is received, the note being associated with the existing assembly manual of the assemblage. For example, manual retriever 222 may be configured to receive the note. As described above for flow diagram 400, a user of user device 106 may capture images of existing assembly manual 402 and provide request/representation 404 to system 200 (e.g., as in step 302 of flowchart 300, or subsequent to step 310) for the generation of interactive smart manual/interactive virtual assistant 416. In embodiments, the user may also provide a note with request/representation 404 to alter or supplement the existing assembly manual for the generation of interactive smart manual/interactive virtual assistant 416. In one example, a note may alter the wording of instructions, part names, hardware, etc., in the existing assembly manual or supplement such instructions, part names, hardware, etc., or a note may annotate an illustration provided in the existing assembly manual.

Notes may be provided in the form of text entered by the user that is associated with the request of request/representation 404. This text may be provided separately from captured images of existing assembly manuals, may be inserted into images at the user device, may be provided as a file(s), and/or may be provided subsequent to performing a preliminary OCR operation by the user device. Notes may also be created by users subsequent to receiving and executing generated interactive smart manual/interactive virtual assistant 416. In such cases, a user may alter or add text via a UI described below with respect to FIG. 7.

User changes/additions may be provided back to system 200/service host 102 from user device 106 for the regeneration or modification of interactive smart manual/interactive virtual assistant 416, may be saved locally to modify interactive smart manual/interactive virtual assistant 416, and/or may be saved locally and provided to system 200/service host 102 for storage and later use.

In step 504, the first set of assembly instructions is generated also based on the note. For instance, the user note may be extracted from text by extractor 210 and/or provided to instruction generator 212 for the generation of first set of assembly instructions 412. Manual generator 218 is then configured to generate interactive smart manual/interactive virtual assistant 416 based on the first set which is based on the user note. Accordingly, the generated interactive smart manual/interactive virtual assistant 416, when executed by the user, will include the user notes in the presentation via the UI to the user. Additionally, language model(s) 228 may be trained or supplemented based on received user notes using machine learning techniques.

Again, with reference to FIGS. 1 and 2, further embodiments herein are described for interactive virtual assistant generation for assemblages. That is, system 100 of FIG. 1 and system 200 of FIG. 2 may each be configured to perform such further functions and operations. As an example, the execution of a generated interactive smart manual/interactive virtual assistant (e.g., 416 above) at a user device (e.g., 106) is described below.

Figure 6:
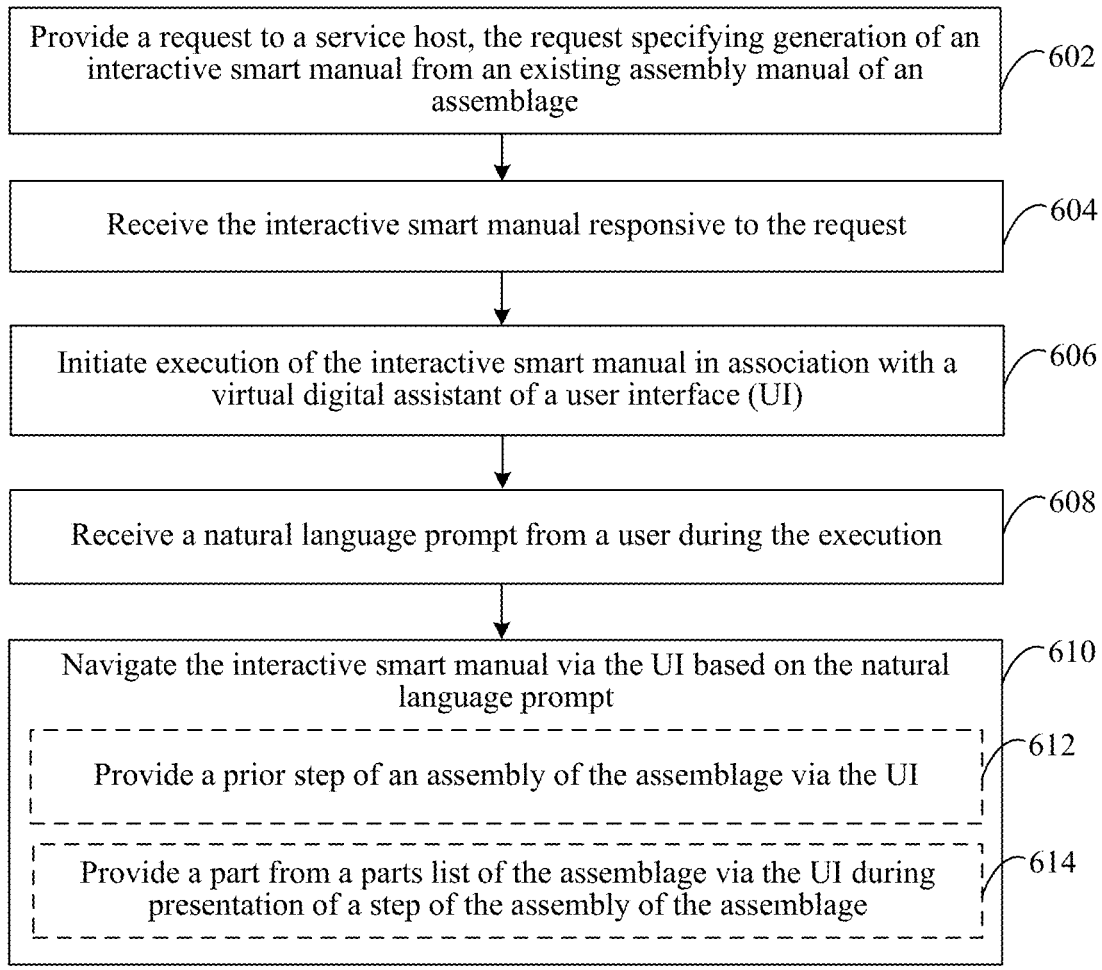
FIG. 6 shows a flowchart for interactive virtual assistant generation for assemblages, in accordance with an example embodiment.
Figure 7:
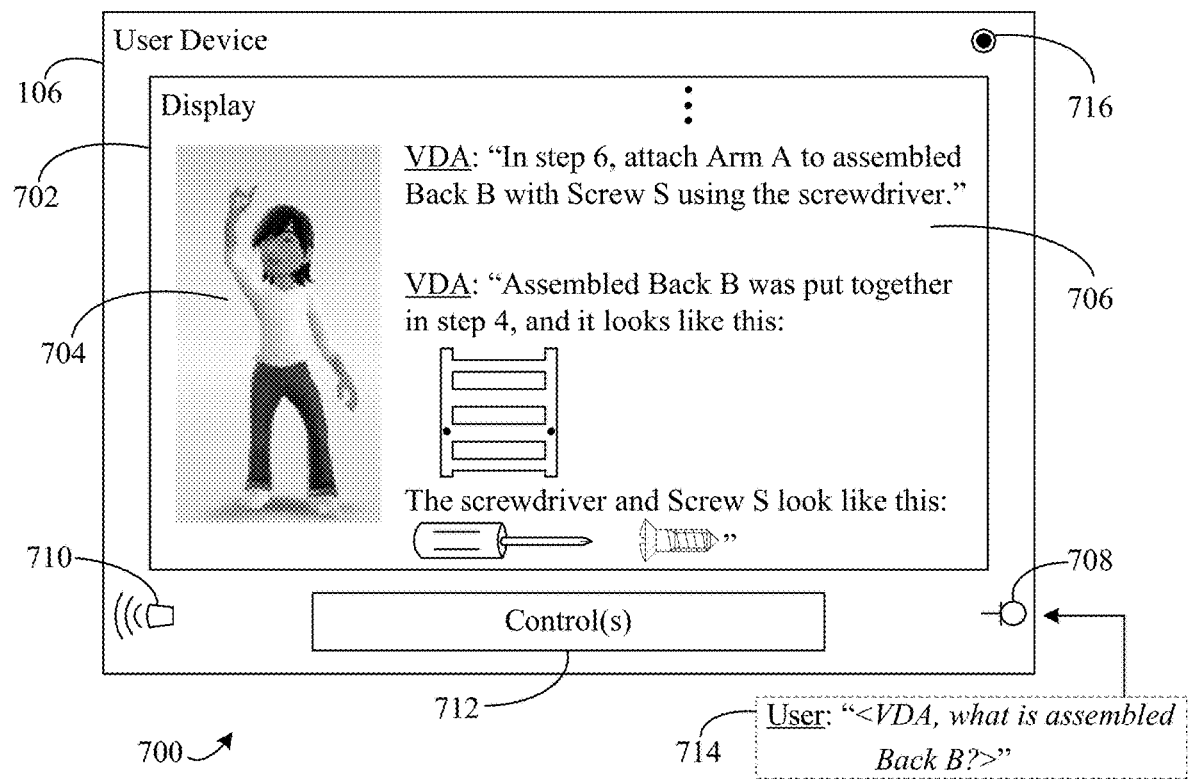
FIG. 7 shows a system for interactive virtual assistant generation for assemblages, in accordance with an example embodiment.

For instance, FIG. 6 and FIG. 7 will now be described. FIG. 6 shows a flowchart 600, and FIG. 7 shows a system 700, for interactive virtual assistant generation for assemblages, according to example embodiments. System 100 and user device 106 in FIG. 1, of which FIG. 7 may be an embodiment, may operate according to flowchart 600, in embodiments. Further structural and operational examples will be apparent to persons skilled in the relevant art(s) based on the following descriptions. Flowchart 600 and system 700 are described as follows with respect to system 100 of FIG. 1. Flowchart 600 begins at step 602.

In step 602, a request is provided to a service host, the request specifying generation of an interactive smart manual from an existing assembly manual of an assemblage. For example, as noted above with respect to FIGS. 3 and 4, user a user may capture images of an existing assembly manual, e.g., via device 106 or other mechanism, and provide a request, with or without a representation of the existing assembly manual based on the capture) to service host 102 (computing device 202 of FIG. 2). The request may either identify the existing assembly manual by an identifier or by inclusion of a representation thereof (e.g., captured images).

Referring also now to FIG. 7, a system 700 is shown that includes user device 106 of FIG. 1. System 700 may be an embodiment of systems and devices described below for FIGS. 8 and 9. User device 106 may include a display 702, a microphone 708, a loudspeaker or micro speaker ("speaker") 710, controls 712, and a camera 716. Images of an existing assembly manual such as existing assembly manual 402 may be captured by camera 716 and provided to service host 102 as a representation of the existing assembly manual along with the request to generate an interactive virtual assistant and/or interactive smart assembly manual, as described herein.

In step 604, the interactive smart manual is received responsive to the request. For instance, user device 106 may receive the interactive smart manual from remote host 104 in response to providing the request in step 602 above. On receipt, user device 106 may store the interactive smart manual in a memory where it may be executed by a processor of device 106.

In step 606 of flowchart 600, execution of the interactive smart manual is initiated in association with a virtual digital assistant of a user interface (UI). For example, user device 106 may be configured to initiate execution of the interactive smart manual, e.g., based on a user command. The user command may be voice activated via a microphone or may be initiated via another input device of user device 106. Initiating execution may cause the interactive smart manual and a virtual digital assistant to be displayed via a UI of user device 106.

Referring back to FIG. 7, once execution is commenced in step 606 by user device 106, part of the UI provided via display 702 displays a virtual digital assistant ("VDA") 704. Additionally, part of the UI provided via display 702 displays an interactive smart manual 706. As shown, interactive smart manual 706 proceeds through steps for assembling an assemblage in conjunction with VDA 704. In the illustrated example, the assemblage is a chair with a ladder back, and the user has progressed to "step 6" using interactive smart manual 706 and/or VDA 704 to navigate the assembly steps. That is, interactive smart manual 706 and/or VDA 704 have just presented "step 6" to the user via text on display 702 and/or via speaker 710 (e.g., VDA 704 may cause audio of "In step 6, attach Arm A to assembled Back B with Screw S using the screwdriver" to be output while interactive smart manual 706 presents this output in text on display 702.

In step 608 of flowchart 600, a natural language prompt is received from a user during the execution. For instance, user device 106 may be configured to receive natural language prompts during the execution of the interactive smart manual initiated in step 606. A user of user device 106 may provide a natural language prompt for a variety of reasons noted herein, including without limitation, navigating between assembly steps of the interactive smart manual, asking questions about parts and/or hardware, repeating explanations of steps, etc.

In step 610, the interactive smart manual is navigated via the UI based on the natural language prompts. For example, display 702 of user device 106 may display steps of the interactive smart manual, in a progression or any other order, according to the instructions of the interactive smart manual. In embodiments, the navigation may include the display of parts, hardware, portions of other steps, etc., as prompted by the user. Optional navigation operations may include one or more of step 612 and/or step 614. In step 612, a prior step of an assembly of the assemblage is provided via the UI. In step 614, a part from a parts list of the assemblage is provided via the UI during presentation of a step of the assembly of the assemblage. The provision of information in the optional navigation operations may comprise audio and/or visual presentation, e.g., via speaker 710, and/or interactive smart manual 706 and/or VDA 704 via display 702, by user device 106.

As shown in FIG. 7, user device 106 may include input devices to receive natural language prompts from a user, e.g., via microphone 708 and/or controls 712 (although it is contemplated herein that camera 716 may also be used as an input device). Microphone 708 may be configured to receive voice/audible prompts. Controls 712 may comprise various input mechanisms, e.g., a keyboard (including virtual keyboards), a select button, a touchpad, etc., and may be configured to accept natural language prompts via touch using the user's finger, a stylus, a light pen, and/or the like. In some embodiments, controls 712 and display 702 may comprise a touch screen. It is contemplated that a UI, as referred to herein, may comprise software and/or hardware elements, and may include one or more of display 702, speaker 710, microphone 708, controls 712, camera 716, interactive smart manual 706, and/or VDA 704, etc.

Continuing with the assembly example above, after "step 6" is provided to the user, the user may not recall what "assembled Back B" is in order to "attach Arm A." Accordingly, the user may speak to VDA 704 and provide a natural language prompt input 714 by asking: "VDA, what is assembled Back B?" VDA 704 in conjunction with interactive smart manual 706 may provide the response to the user's prompt by providing text on display 702 stating "Assembled Back B was put together in "step 4," and looks like this:" followed by an illustration of the assembled parts for the ladder back portion of the chair that was put together in "step 4," as shown in FIG. 7, while also providing to the user an audio representation of the displayed text via speaker 710. Additionally, VDA 704 in conjunction with interactive smart manual 706 may offer additional information related to the user's prompt/question, such as "And the screwdriver looks like this:" followed by an illustration of the screwdriver and similarly accompanied by audio output. Likewise, VDA 704 in conjunction with interactive smart manual 706 might explain what "Screw S" looks like, how many there are, etc., and provide an illustration and audio for this part.

Thus, an interactive virtual assistant and/or interactive smart assembly manual may be generated from any existing assembly manual for assemblages such that execution via UI allows for an improved interface and interaction thereof by a user by providing hands-free, conversation-based interaction using natural language. The prompt-response instructions allow such natural-language inputs to be integrated with assembly instructions for appropriate responses to user prompts and questions that may range across any content related to the assembly.

III. Example Mobile and Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including, such as system 100 of FIG. 1, system 200 of FIG. 2, system 700 of FIG. 7, along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of mobile systems and computing devices provided herein are provided for purposes of illustration, and are not intended to be limiting. Embodiments may be implemented in further types of computer systems, as would be known to persons skilled in the relevant art(s).

Figure 8:
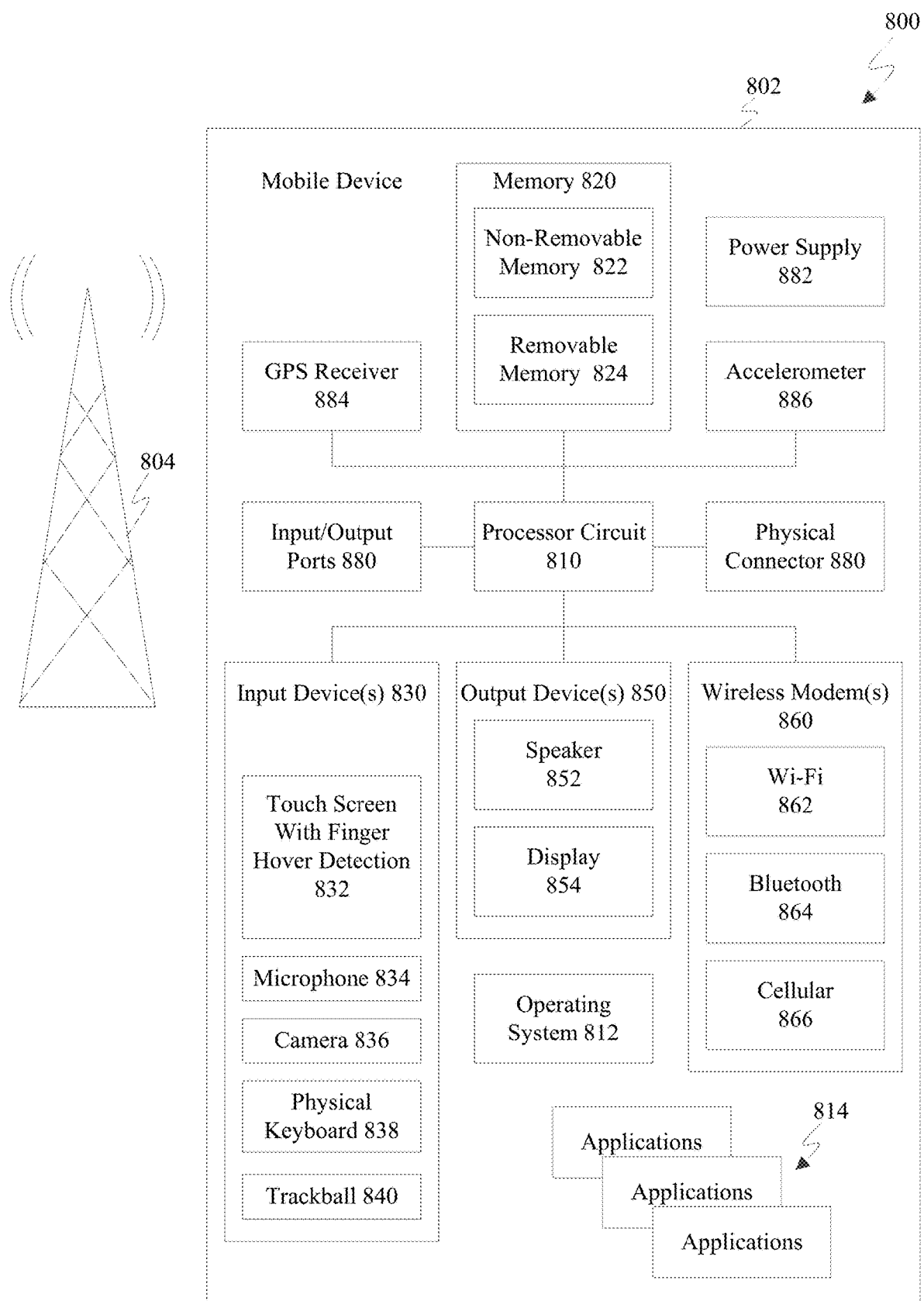
FIG. 8 shows a block diagram of an example mobile system that may be used to implement embodiments.

FIG. 8 is a block diagram of an exemplary mobile system 800 that includes a mobile device 802 that may implement embodiments described herein. For example, mobile device 802 may be used to implement any system, client, or device, or components/subcomponents thereof, in the preceding sections. As shown in FIG. 8, mobile device 802 includes a variety of optional hardware and software components. Any component in mobile device 802 can communicate with any other component, although not all connections are shown for ease of illustration. Mobile device 802 can be any of a variety of computing devices (e.g., cell phone, smart phone, handheld computer, Personal Digital Assistant (PDA), etc.) and can allow wireless two-way communications with one or more mobile communications networks 804, such as a cellular or satellite network, or with a local area or wide area network.

Mobile device 802 can include a controller or processor 810 (e.g., signal processor, microprocessor, ASIC, or other control and processing logic circuitry) for performing such tasks as signal coding, data processing, input/output processing, power control, and/or other functions. An operating system 812 can control the allocation and usage of the components of mobile device 802 and provide support for one or more application programs 814 (also referred to as "applications" or "apps"). Application programs 814 may include common mobile computing applications (e.g., e-mail applications, calendars, contact managers, web browsers, messaging applications) and any other computing applications (e.g., word processing applications, mapping applications, media player applications).

Mobile device 802 can include memory 820. Memory 820 can include non-removable memory 822 and/or removable memory 824. Non-removable memory 822 can include RAM, ROM, flash memory, a hard disk, or other well-known memory devices or technologies. Removable memory 824 can include flash memory or a Subscriber Identity Module (SIM) card, which is well known in GSM communication systems, or other well-known memory devices or technologies, such as "smart cards." Memory 820 can be used for storing data and/or code for running operating system 812 and application programs 814. Example data can include web pages, text, images, sound files, video data, or other data to be sent to and/or received from one or more network servers or other devices via one or more wired or wireless networks. Memory 820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 820. These programs include operating system 812, one or more application programs 814, and other program modules and program data. Examples of such application programs or program modules may include, for example, computer program logic (e.g., computer program code or instructions) for implementing one or more of system 100 of FIG. 1, system 200 of FIG. 2, and system 700 of FIG. 7, along with any components and/or subcomponents thereof, as well any operations and portions of flowcharts/flow diagrams described herein and/or further examples described herein.

Mobile device 802 can support one or more input devices 830, such as a touch screen 832, a microphone 834, a camera 836, a physical keyboard 838 and/or a trackball 840 and one or more output devices 850, such as a speaker 852 and a display 854. Other possible output devices (not shown) can include piezoelectric or other haptic output devices. Some devices can serve more than one input/output function. For example, touch screen 832 and display 854 can be combined in a single input/output device. Input devices 830 can include a Natural User Interface (NUI).

One or more wireless modems 860 can be coupled to antenna(s) (not shown) and can support two-way communications between processor 810 and external devices, as is well understood in the art. Modem 860 is shown generically and can include a cellular modem 866 for communicating with the mobile communication network 804 and/or other radio-based modems (e.g., Bluetooth 864 and/or Wi-Fi 862). At least one wireless modem 860 is typically configured for communication with one or more cellular networks, such as a GSM network for data and voice communications within a single cellular network, between cellular networks, or between the mobile device and a public switched telephone network (PSTN).

Mobile device 802 can further include at least one input/output port 880, a power supply 882, a satellite navigation system receiver 884, such as a Global Positioning System (GPS) receiver, an accelerometer 886, and/or a physical connector 890, which can be a USB port, IEEE 1394 (FireWire) port, and/or RS-232 port. The illustrated components of mobile device 802 are not required or all-inclusive, as any components can be deleted and other components can be added as would be recognized by one skilled in the art.

In an embodiment, mobile device 802 is configured to implement any of the above-described features of flowcharts/embodiments herein, and/or to generate, access, and/or utilize interactive virtual assistants and/or interactive smart assembly manuals as described. Computer program logic for performing any of the operations, steps, and/or functions described herein may be stored in memory 820 and executed by processor 810.

Figure 9:
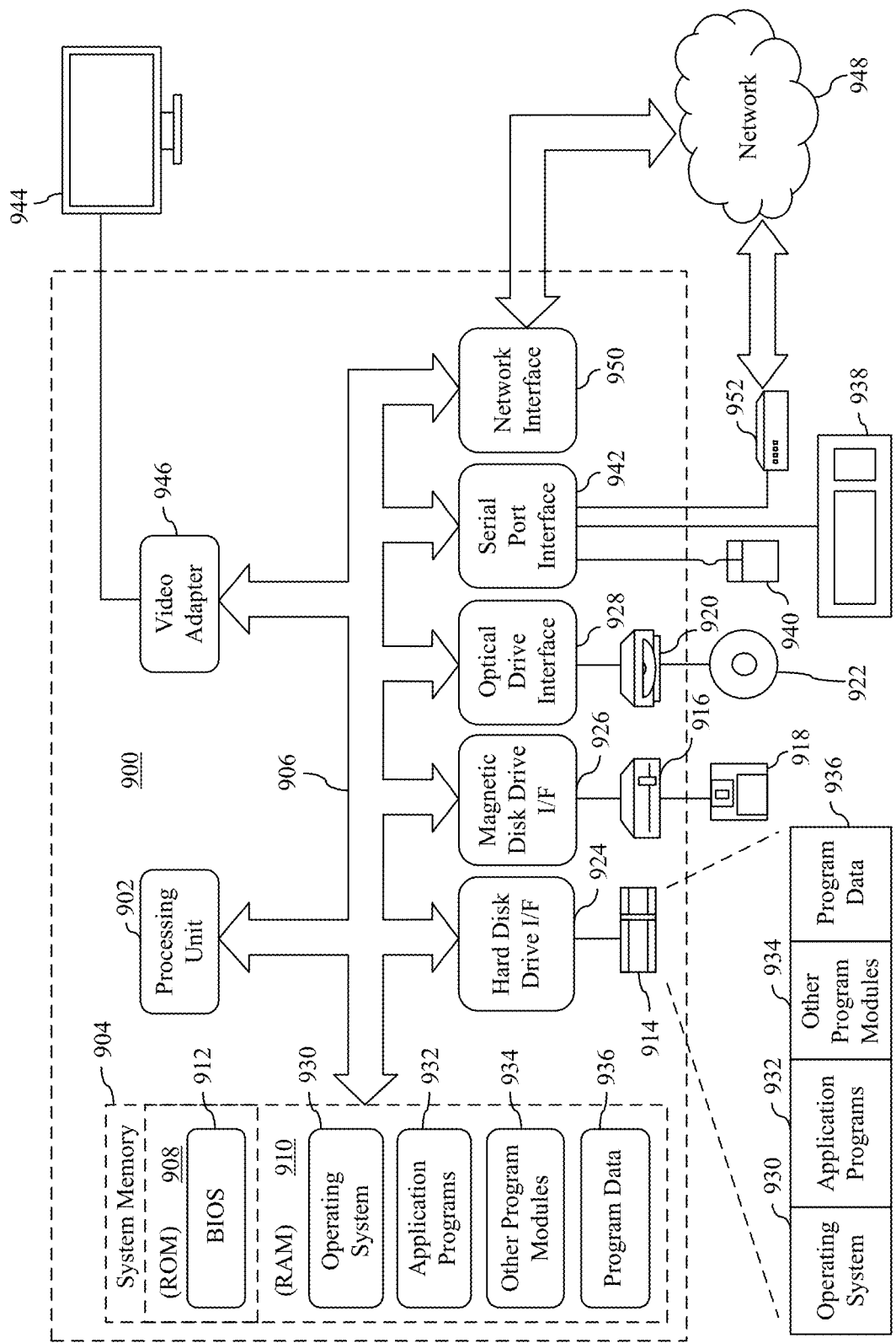
FIG. 9 shows a block diagram of an example computing device that may be used to implement embodiments.

FIG. 9 depicts an exemplary implementation of a computing device 900 in which embodiments may be implemented. For example, embodiments described herein may be implemented in one or more computing devices similar to computing device 900 in stationary or mobile computer embodiments, including one or more features of computing device 900 and/or alternative features. The description of computing device 900 provided herein is provided for purposes of illustration, and is not intended to be limiting. Embodiments may be implemented in further types of computer systems and/or game consoles, etc., as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing embodiments described herein, such as but not limited to, system 100 of FIG. 1, system 200 of FIG. 2, and system 700 of FIG. 7, along with any components and/or subcomponents thereof, as well as the flowcharts/flow diagrams described herein, including portions thereof, and/or further examples described herein.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," "computer-readable storage medium," and "computer-readable storage device," etc., are used to refer to physical hardware media. Examples of such physical hardware media include the hard disk associated with hard disk drive 914, removable magnetic disk 918, removable optical disk 922, other physical hardware media such as RAMs, ROMs, flash memory cards, digital video disks, zip disks, MEMs, nanotechnology-based storage devices, and further types of physical/tangible hardware storage media (including memory 920 of FIG. 9). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 942, or any other interface type. Such computer programs, when executed or loaded by an application, enable computing device 900 to implement features of embodiments discussed herein. Accordingly, such computer programs represent controllers of the computing device 900.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Example and Advantages

As described, systems and devices embodying the techniques herein may be configured and enabled in various ways to perform their respective functions. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

As described herein, systems, devices, components, etc., of the embodiments that are configured to perform functions and/or operations are also contemplated as performing such functions and/or operations.

The described embodiments combine new methods of generating instances of interactive virtual assistants and/or interactive smart assembly manuals from any existing assembly manual for any assemblages. The generation of these interactive tools includes generating prompt-response instructions that allow for natural-language inputs of users at user devices to be integrated with and applied to assembly instructions to produce and provide appropriate responses to user prompts and questions that may range across any content related to the assembly. The execution of these interactive tools via a UI allows for an improved interface and interaction thereof by a user by providing hands-free, conversation-based interaction, using natural language, for any type of existing assembly manual.

Additionally, the interactive navigation and responses to voice prompts provide for a UI that can efficiently identify answers to user questions, allowing the generating instances of interactive to inform the user via the UI of information that may be unclear or forgotten during the assembly process, which may take users significant time to answer themselves, if at all.

UIs are also improved by allowing users to add or integrate their own notes, via alterations, annotations, and additions, into assembly instructions for greater clarity and understanding during the assembly process through presentation of the user notes via the UI, including at later times when an assemblage must be taken apart or put back together such as when moving to a new residence.

Further, generated instances of interactive virtual assistants and interactive smart assembly manuals may be stored persistently at user devices or remotely, e.g., in the cloud, for later user without the need to maintain a physical file of assembly manuals. Similarly, lost assembly manuals can be retrieved automatically over a network such as the Internet from remote servers.

The embodiments herein also provide for the ability to produce instances of interactive virtual assistants and interactive smart assembly manuals quickly and efficiently via instruction models and language models, thus reducing the amount of computing resources required to provide such interactive tools while allowing the flexibility to generate these interactive tools for any representation of any existing assembly manual. That is, rather than requiring manufacturers to dedicate computing resources and employ developers to create specific electronic manuals for each assemblage in a product line, the embodiments herein allow for a centralized service, that generates customizable instances of interactive virtual assistants and interactive smart assembly manuals through user notes, and performs the generation automatically on an as needed basis that is driven by user requests.

Moreover, the embodiments described herein may utilize a combination of models to generate different sets of program instructions which are combined and integrated to provide a seamless UI experience for assembly of an assemblage based on natural language prompts and responses, which was previously not available for software services and applications, much less for automatically generating instances of interactive virtual assistants and interactive smart assembly manuals that guide users through assembly tasks for assemblages.

Furthermore, it is also contemplated herein that embodiments herein encompass not only assemblages, but also any process utilizing existing instructions and/or illustrations to complete a task, including but without limitation, cooking/baking, household chores/tasks, maintenance tasks such as auto repair, etc.

The additional examples and embodiments described in this Section may be applicable to examples disclosed in any other Section or subsection of this disclosure.

Embodiments in this description provide for systems, devices, and methods for interactive virtual assistant generation for assemblages. For instance, a system is described herein. The system may be configured and enabled in various ways for such interactive virtual assistant generation for assemblages, as described herein. The system includes a processing system that includes one or more processors, and a memory that stores computer program instructions to be executed by the processing system. The computer program instructions include a manual retriever to, or be configured to, receive a representation of an existing assembly manual of an assemblage, and an extractor to, or be configured to, extract information from the representation. The computer program instructions include an instruction generator to, or be configured to, generate a first set of assembly instructions based at least on the information from the representation, and generate a second set of prompt-response instructions based on a language model and the information. The computer program instructions include a manual generator to, or be configured to, generate an interactive smart manual of the assemblage based at least on the first set and the second set.

In an embodiment of the system, the interactive smart manual is generated to be executed in association with a virtual digital assistant at a user device.

In an embodiment of the system, the extractor, to extract the information from the representation, extracts or is configured to extract one or more illustrations from the representation, and or is configured to extracts one or more portions of text from the representation. In the embodiment, the instruction converter, to generate the first set of assembly instructions, generates or is configured to generate the first set of assembly instructions from at least one of the one or more images or the one or more portions of text.

In an embodiment of the system, the instruction converter, to generate the first set of assembly instructions, generates or is configured to generate, from at least one of the one or more images or the one or more portions of text, one or more of a number of assembly steps to complete the assemblage, a parts list of the assemblage, and/or a hardware list for assembly the assemblage.

In an embodiment of the system, the representation of the existing assembly manual comprises at least one of an electronic file stored with a website and/or one or more captured images stored at a user device.

In an embodiment of the system, the manual retriever receives or is configured to receive an identifier of the assemblage, and automatically locate the representation over a network.

In an embodiment of the system, the prompt-response instructions, based at least on natural language user input received via a user device, navigate or are configured to navigate between ones of the assembly instructions, cause a display of a portion of the assemblage by the user device, and cause an audio description of a part of the assemblage to be played back by the user device.

In an embodiment of the system, the manual retriever receives or is configured to receive a note generated by a user, the note being associated with the existing assembly manual of the assemblage, and the instruction converter generates or is configured to generate the first set of assembly instructions also based on the note.

A computer-implemented method is also described herein. The computer-implemented method may be for interactive virtual assistant generation for assemblages, as described herein. The computer-implemented method includes extracting information from a representation of an existing assembly manual of an assemblage, and generating a first set of assembly instructions based on the information from the representation and an instruction model. The computer implemented method also includes generating a second set of prompt-response instructions based on a language model and the information, and generating an interactive smart manual of the assemblage based at least on the first set and the second set, the interactive smart manual being an instance of a virtual digital assistant that is specific to the assemblage.

In an embodiment of the computer-implemented method, extracting the information from the representation includes at least one of extracting one or more images from the representation and/or extracting one or more portions of text from the representation. In the embodiment, generating the first set of assembly instructions includes generating the first set of assembly instructions from at least one of the one or more images or the one or more portions of text.

In an embodiment of the computer-implemented method, generating the first set of assembly instructions includes generating, from at least one of the one or more images or the one or more portions of text, one or more of a number of assembly steps to complete the assemblage, a parts list of the assemblage, and/or a hardware list for assembly the assemblage.

In an embodiment of the computer-implemented method, the representation of the existing assembly manual includes at least one of an electronic file stored with a website and/or one or more captured images stored at a user device.

In an embodiment, the computer-implemented method includes receiving an identifier of the assemblage, and automatically locating the representation over a network.

In an embodiment of the computer-implemented method, said generating the second set of prompt-response instructions includes generating the second set of prompt-response instructions as including responses to vocalized natural language user inputs received via a user interface to perform at least one of navigating between ones of the assembly instructions, causing a display of a portion of the assemblage by a user device, and/or causing an audio description of a part of the assemblage to be played back by the user device.

In an embodiment, the computer-implemented method includes training at least one of the instruction model or the language model based on information received from the user device subsequent to providing the interactive smart manual to the user device.

In an embodiment, the computer-implemented method includes receiving a note generated by a user, the note being associated with the existing assembly manual of the assemblage, and generating the first set of assembly instructions also based on the note.

A computer-readable storage medium having program instructions recorded thereon that, when executed by at least one processing device, perform a method, is also described. The method may be for interactive virtual assistant generation for assemblages, as described herein. The method includes providing a request to a service host, the request specifying generation of an interactive smart manual from an existing assembly manual of an assemblage, and receiving the interactive smart manual responsive to the request. The method also includes initiating execution of the interactive smart manual in association with a virtual digital assistant of a user interface (UI) and receiving a natural language prompt from a user during the execution. The method further includes navigating the interactive smart manual via the UI based on the natural language prompt.

In an embodiment of the computer-readable storage medium, said navigating includes at least one of providing a prior step of an assembly of the assemblage via the UI and/or providing a part from a parts list of the assemblage via the UI during presentation of a step of the assembly of the assemblage.

In an embodiment of the computer-readable storage medium, said navigating includes providing a step of an assembly of the assemblage, to the user via the UI, that includes content of a note created by the user that was included in the request.

In an embodiment of the computer-readable storage medium, said providing the request includes providing at least one of an image of the existing assembly manual, an identifier of the existing assembly manual and an indication by the user to retrieve the existing assembly manual over a network, and/or a note created by the user that includes information associated with an assembly step of the assemblage.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A system comprising:
a processing system that includes one or more processors; and
a memory that stores computer program instructions that are executable by the processing system, the computer program instructions including:
a manual retriever that:
receives a representation of an existing assembly manual of an assemblage; and
receives a note generated by an end user from a user device of the end user, the note being associated with the existing assembly manual of the assemblage;
an extractor that:
extracts information from the representation;
an instruction generator that:
generates a first set of assembly instructions based at least on the information from the representation and the note; and
generates a second set of prompt-response instructions based on a language model and the information; and
a manual generator that:
generates an interactive smart manual of the assemblage based at least on the first set and the second set.

2. The system of claim 1, wherein the interactive smart manual is generated to be executed in association with a virtual digital assistant at the user device.

3. The system of claim 1, wherein the extractor, to extract the information from the representation:
extracts one or more illustrations from the representation; and
extracts one or more portions of text from the representation; and
wherein the instruction generator, to generate the first set of assembly instructions:
generates the first set of assembly instructions from at least one of the one or more illustrations or the one or more portions of text.

4. The system of claim 3, wherein the instruction generator, to generate the first set of assembly instructions, generates, from at least one of the one or more illustrations or the one or more portions of text, one or more of:
a number of assembly steps to complete the assemblage;
a parts list of the assemblage; and
a hardware list for assembly the assemblage.

5. The system of claim 1, wherein the representation of the existing assembly manual comprises at least one of:
an electronic file stored with a website; and
one or more captured images stored at the user device.

6. The system of claim 5, wherein the manual retriever:
receives an identifier of the assemblage; and
automatically locates the representation over a network.

7. The system of claim 1, wherein the prompt-response instructions, based at least on natural language user input received via the user device:
navigate between ones of the assembly instructions;
cause a display of a portion of the assemblage by the user device; and
cause an audio description of a part of the assemblage to be played back by the user device.

8. The system of claim 1, wherein the note generated by the end user includes an annotation to an illustration in the existing assembly manual.

9. A computer-implemented method, comprising:
extracting information from a representation of an existing assembly manual of an assemblage;
generating a first set of assembly instructions based on the information from the representation and an instruction model;
generating a second set of prompt-response instructions based on a language model and the information, at least one prompt-response instruction of the second set causing a display, by a user device of an end user, of a portion of the assemblage responsive to a vocalized natural language input request therefor made by the end user; and
generating an interactive smart manual of the assemblage based at least on the first set and the second set, the interactive smart manual being an instance of a virtual digital assistant that is specific to the assemblage.

10. The computer-implemented method of claim 9, wherein extracting the information from the representation comprises at least one of:
extracting one or more illustrations from the representation, and extracting one or more portions of text from the representation; and
wherein generating the first set of assembly instructions comprises:
generating the first set of assembly instructions from at least one of the one or more illustrations or the one or more portions of text.

11. The computer-implemented method of claim 10, wherein generating the first set of assembly instructions comprises:

generating, from at least one of the one or more illustrations or the one or more portions of text, one or more of:
- a number of assembly steps to complete the assemblage;
- a parts list of the assemblage; and
- a hardware list for assembly the assemblage.

12. The computer-implemented method of claim 9, wherein the representation of the existing assembly manual comprises at least one of:
- an electronic file stored with a website; and
- one or more captured images stored at the user device.

13. The computer-implemented method of claim 12, further comprising:
- receiving an identifier of the assemblage; and
- automatically locating the representation over a network.

14. The computer-implemented method of claim 9, wherein said generating the second set of prompt-response instructions comprises:
- generating the second set of prompt-response instructions as including responses to vocalized natural language user inputs received via the user interface to also perform at least one of:
  - navigating between ones of the assembly instructions; and
  - causing an audio description of a part of the assemblage to be played back by the user device.

15. The computer-implemented method of claim 14, further comprising:
- training at least one of the instruction model or the language model based on information received from the user device subsequent to providing the interactive smart manual to the user device.

16. The computer-implemented method of claim 9, further comprising:
- receiving a note generated by the end user, the note being associated with the existing assembly manual of the assemblage; and
- generating the first set of assembly instructions also based on the note.

17. A computer-readable storage medium having program instructions recorded thereon that, when executed by a processing device, perform a method comprising:
- extracting information from a representation of an existing assembly manual of an assemblage;
- generating a first set of assembly instructions based on the information from the representation and an instruction model;
- generating a second set of prompt-response instructions based on a language model and the information, at least one prompt-response instruction of the second set causing a display, by a user device of an end user, of a portion of the assemblage responsive to a vocalized natural language input request therefor made by the end user; and
- generating an interactive smart manual of the assemblage based at least on the first set and the second set, the interactive smart manual being an instance of a virtual digital assistant that is specific to the assemblage.

18. The computer-readable storage medium of claim 17, wherein the representation of the existing assembly manual comprises at least one of:
- an electronic file stored with a website; and
- one or more captured images stored at the user device.

19. The computer-readable storage medium of claim 17, wherein said generating the second set of prompt-response instructions comprises:
- generating the second set of prompt-response instructions as including responses to vocalized natural language user inputs received via the user interface to also perform at least one of:
  - navigating between ones of the assembly instructions; and
  - causing an audio description of a part of the assemblage to be played back by the user device.

20. The computer-readable storage medium of claim 17, wherein the method further comprises:
- receiving a note generated by the end user, the note being associated with the existing assembly manual of the assemblage; and
- generating the first set of assembly instructions also based on the note.

* * * * *